Dec. 20, 1938.  R. ATWOOD  2,140,729
SPOOL
Filed Oct. 30, 1935
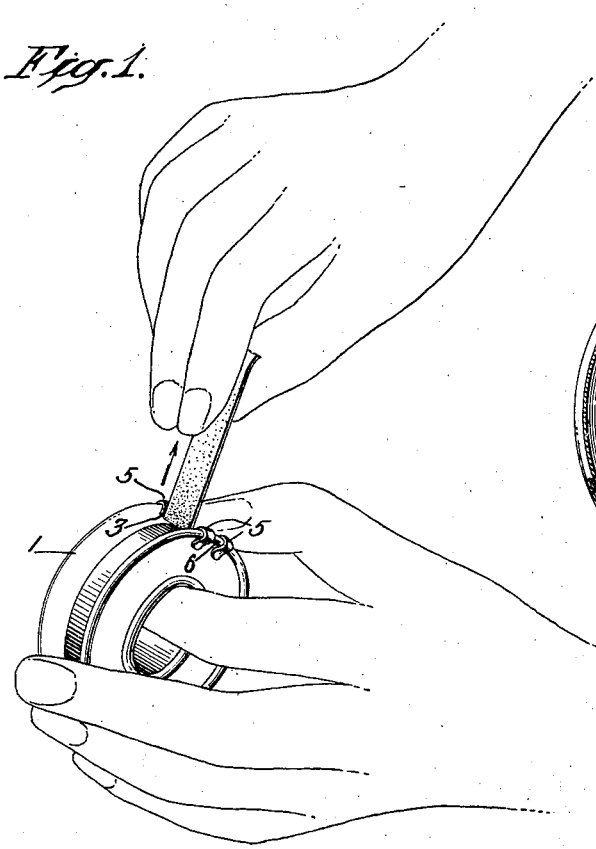
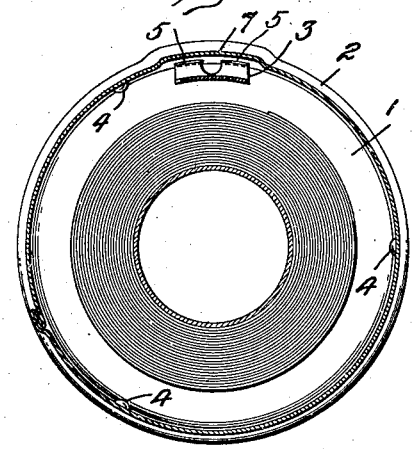
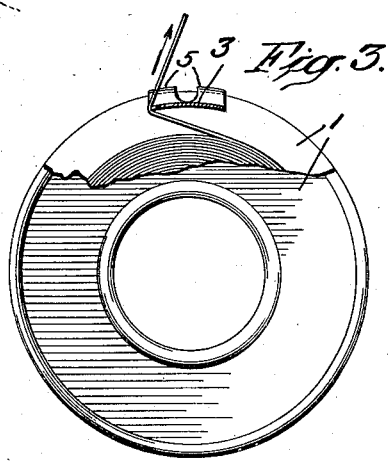
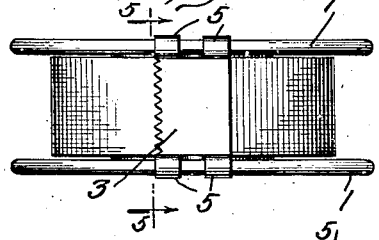
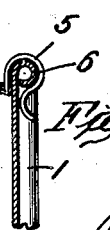
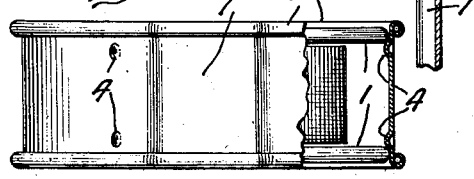
INVENTOR
Rawson Atwood
BY
ATTORNEYS Patented Dec. 20, 1938

2,140,729

UNITED STATES PATENT OFFICE 2,140,729

SPOOL

Rawson Atwood, Brooklyn, N. Y., assignor to Decorated Metal Manufacturing Co. Inc., Brooklyn, N. Y., a corporation of New York Application October 30, 1935, Serial No. 47,378

1 Claim. (Cl. 206—52)

This invention relates to improvements in spools and containers therefor designed primarily for the reception and housing of surgical adhesive tape but useful also, as to some of its features, in connection with other types of tape.

The device provided by the present invention consists of a flanged spool on which the tape is to be wound, a container or casing therefor for receiving and frictionally interlocking with the spool, so that the latter may be easily introduced and removed from it as required, and a cutting means movably attached to the flanges of the spool so that it may be moved circumferentially to any desired position for the severing of sections or lengths of the wound tape.

In the accompanying drawing—

Figure 1 is a perspective view of the spool (removed from its casing) and its cutting means, showing the manner in which the latter is used for the severing of desired lengths of tape.

Figure 2 is a cross section of the spool and its casing, showing the tape wound upon the spool, the cutting means thereon for severing tape lengths, and the means for frictionally locking the spool to the casing.

Figure 3 is an end view of the spool itself, partly broken away, also illustrating the manner in which the cutter is used for the severing of tape lengths.

Figure 4 is a side view of the spool with its cutting means.

Figure 5 is a section thereof on the line 5 of Figure 4; and

Figure 6 is a side view, partly in section, showing the means for frictionally locking the spool to its casing.

In said drawing, 1 represents the flanged spool and 2 its casing, while 3 represents the cutter mounted on the spool.

The spool is of ordinary construction and when introduced into the casing 2 it is frictionally locked therein by engagement with inwardly punched projections 4 which frictionally engage the flanges of the spool 1; the spool and casing being of sheet metal and the spool readily introduced into the casing into engagement with the projections 4 and as readily removed from the casing when such removal is necessary for the unwinding of the tape on the spool.

The cutting means 3 consists of a carrier provided with a serrated cutting edge, and this carrier is mounted on the spool flanges by clips 5 extending around and under outwardly bent beads 6 on the spool flanges. This connection between the cutter and the spool flanges maintains the cutter in proper relation to the wound tape and also permits the movement of the cutter to any desired position circumferentially of the flanges for the severing of any desired length of tape wound upon the spool barrel. The cutter is provided with two such clips at each of its ends so as to retain the cutter firmly in position during the tearing or cutting of tape lengths.

It will be noted, as clearly shown in the drawing, particularly in Fig. 5 thereof, that the cutter is disposed between the flanges and below the peripheries thereof with the clips extending upwardly for engagement with the flanges.

The clips necessarily project beyond the beads 6 of the spool and for this reason the casing is provided interiorly with a recess 7 for the reception and passage of the cutter on the introduction of the spool into the casing and its removal therefrom.

I claim:

A spool for tape comprising a barrel for receiving a winding thereof, a pair of flanges at the ends of the barrel having outwardly turned beads at their edges, and a cutter carrier mounted on the beads of the flanges and manually slidable thereon to different cutting positions around the barrel and provided with means extending around and under the beads to hold the carrier in engagement with the beads between the flanges and below the peripheries thereof, and a casing for said spool comprising a recess for the reception and passage of the cutter on the introduction of the spool into the casing and its removal therefrom.

RAWSON ATWOOD.